United States Patent [19]

Lauder

[11] Patent Number: 5,002,439
[45] Date of Patent: Mar. 26, 1991

[54] METHOD FOR CUTTING NONMETALLIC MATERIALS

[75] Inventor: Edward A. Lauder, Greer, S.C.

[73] Assignee: Advanced Composite Materials Corporation, Greer, S.C.

[21] Appl. No.: 550,213

[22] Filed: Jul. 10, 1990

Related U.S. Application Data

[63] Continuation of Ser. No. 480,368, Feb. 14, 1990, abandoned, which is a continuation of Ser. No. 155,443, Feb. 12, 1988, abandoned.

[51] Int. Cl.$^5$ ............................................. B26D 1/12
[52] U.S. Cl. ................................. 407/54; 407/119; 51/309
[58] Field of Search .................... 407/54, 119; 51/309, 51/298, 295

[56] References Cited

U.S. PATENT DOCUMENTS

| | | |
|---|---|---|
| 3,514,828 | 6/1970 | Wale . |
| 3,833,389 | 9/1974 | Komeya et al. . |
| 3,918,218 | 11/1975 | Zoiss .................................. 51/298 |
| 4,052,530 | 10/1977 | Fonzi ................................. 428/932 |
| 4,063,908 | 11/1977 | Ogawa et al. . |
| 4,074,471 | 2/1978 | Komanduri et al. ............. 51/295 |
| 4,158,687 | 6/1979 | Yajima et al. . |
| 4,323,323 | 4/1982 | Lumby et al. . |
| 4,343,909 | 8/1982 | Adams et al. . |
| 4,366,254 | 12/1982 | Rich et al. . |
| 4,407,968 | 10/1983 | Lee et al. ........................... 51/309 |
| 4,416,840 | 11/1983 | Lee et al. ........................... 501/87 |
| 4,463,058 | 7/1984 | Hood et al. . |
| 4,479,163 | 10/1984 | Bannink .............................. 361/218 |
| 4,502,092 | 2/1985 | Bannink .............................. 361/218 |
| 4,507,224 | 3/1985 | Toibana et al. . |
| 4,526,875 | 7/1985 | Yamamoto et al. . |
| 4,543,343 | 9/1985 | Iyori et al. . |
| 4,543,345 | 9/1985 | Wei . |
| 4,554,201 | 11/1985 | Andreev et al. . |
| 4,585,500 | 4/1986 | Minjolle et al. . |
| 4,607,017 | 8/1986 | Wolfe et al. ....................... 51/307 |
| 4,657,877 | 4/1987 | Becher et al. . |
| 4,666,467 | 5/1987 | Matsumoto et al. . |
| 4,746,635 | 5/1988 | Inoue et al. . |
| 4,749,667 | 6/1988 | Jun et al. . |
| 4,770,673 | 9/1988 | Ketcham et al. ................. 51/309 |
| 4,789,277 | 2/1989 | Rhodes et al. .................... 407/119 |

FOREIGN PATENT DOCUMENTS

| | | |
|---|---|---|
| 86/301597 | 9/1986 | European Pat. Off. . |
| 0208910 | 10/1986 | European Pat. Off. . |
| 0067584 | 8/1987 | European Pat. Off. . |
| 58-48621 | of 1983 | Japan . |
| 59-10268 | of 1984 | Japan . |
| 59-54680 | of 1984 | Japan . |
| 59-137366 | 7/1984 | Japan . |
| 954285 | 4/1964 | United Kingdom . |
| 2157282A | 4/1985 | United Kingdom . |
| 2211184 | 6/1989 | United Kingdom . |

OTHER PUBLICATIONS

Abstract, Mitsubish Metal Corp. 102:171498x.
Becher et al., Comm. Am. Ceram. Soc., "Toughening Behavior in SiC-Whisker-Reinforced Alumina", Dec. 1984, pp. C≧267–269.
Beecher et al., "Transformation Toughened* and Whisker Reinforced** Ceramics", Proc. of 21st Auto. Tech. Dev., pp. 201–205.
Wei et al., "Development of Sic-Whisker-Reinforced Ceramisc", Am. Ceram. Soc. Bull., 64 [2]298–304 (1985).
Milewski et al., "Handbook of Fillers and Reinforcements for Plastics", p. 446.

(List continued on next page.)

*Assistant Examiner*—Lawrence Cruz
*Attorney, Agent, or Firm*—Banner, Birch, McKie & Beckett

[57] ABSTRACT

A method for cutting nonmetallic materials such as wood, wood composites, and graphite composites using a ceramic composite router of unitary construction is disclosed. The ceramic composite material is comprised of an alumina matrix reinforced with silicon carbide whiskers.

3 Claims, 2 Drawing Sheets

OTHER PUBLICATIONS

Perry et al., "Chemical Engineers' Handbook", Fifth Edition, 1973.

Milewski, "Short-Fiber Reinforcements: Where the Action Is", Plastics Compounding, Nov./Dec. 1979, pp. 17–37.

Urban, "Cutting Tool Update", *Wood & Wood Products*, Feb. 1987.

Stewart et al., "High-Temperature Corrosion of Tungsten Carbide from Machining Medium-Density Fiberboard", *The Carbide Tool Journal*, pp. 2–7, Jan.–Feb. 1986.

Lorini, "Ceramic Bits Are Coming", *Woodshop News*, p. 18, May 1987.

"The Application of WG-300 'Whisker' Reinforced Ceramic/Ceramic Composites", published by Greenleaf Corporation (undated).

*Primary Examiner*—Frederick R. Schmidt

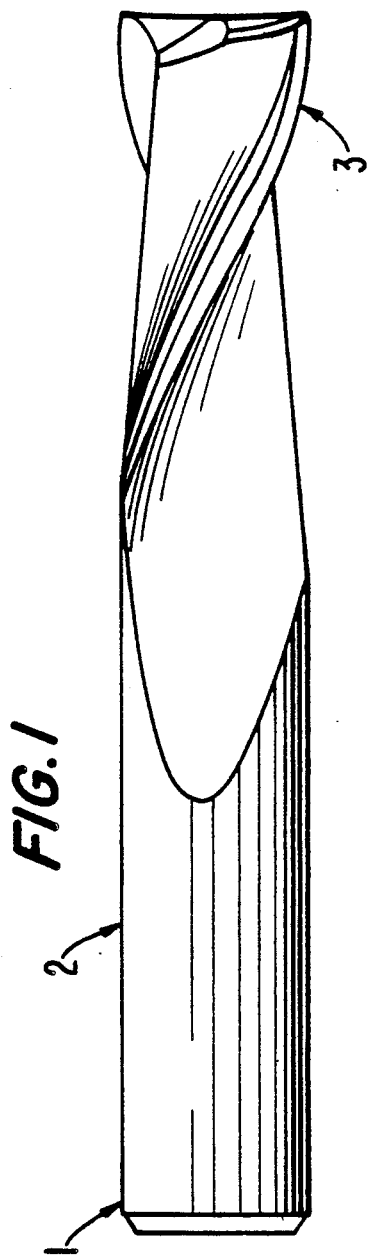
FIG. I

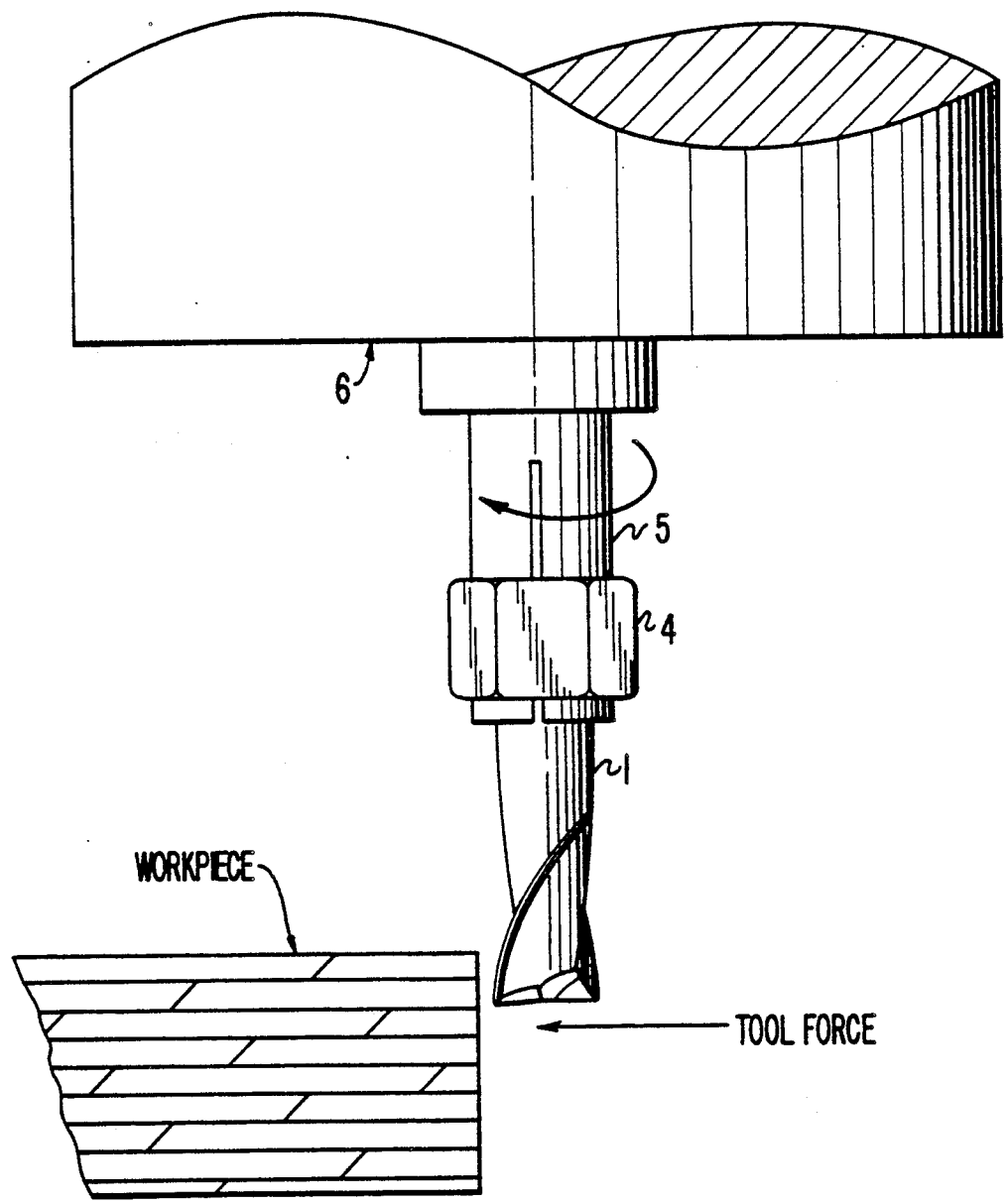

METHOD FOR CUTTING NONMETALLIC MATERIALS

This application is a continuation of application Ser. No. 480,368, filed Feb. 14, 1990, now abandoned which is a continuation of application Ser. No. 155,443, filed Feb. 12, 1988, now abandoned.

FIELD OF THE INVENTION

The invention herein relates to a method for machining nonmetallic materials.

BACKGROUND OF THE INVENTION

The machining of nonmetallic materials such as wood, wood composites, and graphite composites is one of the most important and widely used processes in manufacturing. One of the most important machining operations is the use of routers to cut grooves in or finish the edges of a workpiece.

Routers, which are just one type of cutting tool, are manufactured in a number of different shapes and sizes. A double fluted router is shown in FIG. I. The mode of operation is essentially the same for all routers. The router mounts in the spindle of a rotary tool head and rotates about its longitudinal axis. The workpiece is moved into the router in a direction perpendicular to the longitudinal axis of the router. The cutting edge of the router meets the workpiece and cuts a groove as the workpiece is advanced. FIG. II illustrates this machining process.

The width of the groove cut by the router is equal to the diameter of the router. The depth of the groove is equal to the depth of cut, i.e. the distance from the top of the workpiece to the tip of the router. The cutting speed is the revolutions per minute (rpm) of the router. The feed rate is the rate of advancement of the workpiece measured in inches per minute (ipm).

A variety of materials have been used or suggested for routers, including tool steels, high speed steels, cast non-ferrous alloys, metal bonded carbides, and ceramics. The performance of these materials is measured by productivity, tool life, and cleanliness of the cut.

Productivity, which is the rate of removal of material from the workpiece, may be calculated based on the depth of cut, the width of cut, and feed rate. These three factors in turn are dependent on the cutting speed Tool life is measured in terms of the amount of material removed before failure. Failure occurs either suddenly by breakage or gradually by abrasion, corrosion, or dulling of the cutting edge. The cleanliness of cut is determined by the smoothness of the machined surface and by lack of defects such as burn marks.

Tool steel, high speed steel and cast non-ferrous alloys are restricted to relatively low cutting speeds because they all have critical temperature limitations. Carbide materials, such as tungsten carbide, can run at cutting speeds much higher than those of the steels. However, the carbides are often run at relatively low feed rates because they are relatively brittle and are susceptible to impact breakage Also, tungsten carbide suffers high-temperature corrosion as a result of the chemical interaction with the workpiece at the high temperatures generated when cutting materials such as wood or medium-density fiberboard. See Steward, "High Temperature Corrosion of Tungsten Carbide from Machining Medium-Density Fiber Wood", *The Carbide and Tool Journal*, January-February, 1986.

Ceramic materials, such as alumina, can operate at much higher speeds and temperatures than conventional steel and carbide materials. Ceramics, however, are even more brittle than carbides and tend to fracture catastrophically and unexpectedly when subjected to impact. Thus, ceramics can be operated only at quite low feed rates References relating to the use of ceramics as cutting tools include U.S. Pat. Nos. 4,063,908 ("Ogawa"), 4,323,323 ("Lumby"), 4,343,909 ("Adams"), 4,366,254 ("Rich"), 4,526,875 ("Yamamoto"), 4,543,343 ("Iyori"), 4,554,201 ("Andreev"), and 3,514,828 ("Wale"); Japanese patent numbers 5,848,621 ("Yajima"), and 6,005,079 ("Mitsu Metal"); United Kingdom patent number 2,157,282 ("Santrade"); and pending U.S. patent application Ser. No. 830,773 ("Rhodes").

Of all these references, only Mitsu Metal, Santrade, and Rhodes suggest the use of whisker reinforced ceramics in cutting tools; and neither of these three disclose a method for cutting nonmetallic materials such as wood, wood composites, and graphite composite using a rotter comprised of alumina reinforced with silicon carbide whiskers. Rhodes, which is perhaps the closest reference, claims generally cutting tools comprised of alumina reinforced with silicon carbide whiskers It also discloses the use of such tools to cut metal.

Wale describes the use of ceramic or tungsten carbide as a cutting insert mounted by brazing or with adhesive on the flutes of high speed steel end mill cutters. The inserts are backed entirely by the highspeed steel center member.

It has been suggested that silicon carbide fiber reinforced ceramic can be used in various machine parts, including heat exchangers, molds, ,nozzles, turbines, valves and gears. See Japanese patents nos. 59-54680 and 59-102681. Such disclosures, however, are not particularly pertinent to the invention described herein, since such parts are not primarily subjected to impact stresses as part of their normal service environment. No mention is made of improved toughness or impact resistance nor are such properties of interest in the articles described.

It has also been disclosed that fracture toughness in ceramics can be improved by incorporation of silicon carbide whiskers into the ceramics Papers by Becher and Wei have described mechanisms for increase in toughness as related to whisker content and orientation. See Becher and Wei, "Toughening Behavior in SiC Whisker Reinforced Alumina", *Comm. Am. Cer. Soc.* (September, 1984); Wei, "Transformation Toughened and Whisker Reinforced Ceramics", *Soc. Auto. Engrs.*, Proc. 21st Auto. Tech. Dev. Mtg., 201-205 (March, 1984); and Wei and Becher, "Development of SiC-Whisker-Reinforced Ceramics," *Am. Ceram. Soc. Bull.*, p. 298-304 (February 1985). See also U.S. Pat. No. 4,543,345 ("Wei").

Neither the cited papers nor the Wei patent suggest the use of alumina reinforced with silicon carbide whiskers for cutting nonmetallic materials. Also, while these references disclose that alumina reinforced wit silicon carbide whiskers shows increased fracture toughness and flexural strength, they do not disclose thermal shock resistance, or the ability of the material to withstand the combination of severe shear, tensile, and compressive stresses and repeated impact loading experienced by a router.

BRIEF SUMMARY OF THE INVENTION

The invention herein is a method for cutting nonmetallic materials using a router of unitary construction consisting essentially of an alumina matrix reinforced with silicon carbide whiskers The whisker content in the ceramic matrix is about 2 to about 40 volume percent whiskers. The alumina matrix may contain minor amounts of zirconia, yttria, hafnia, magnesia, lanthana, silicon nitride, titanium carbide, or mixtures thereof.

THE DRAWINGS

FIG. I shows a two fluted router.

FIG. II graphically illustrates the method by which a router is used to machine a workpiece

DETAILED DESCRIPTION OF THE INVENTION

The present invention is based on the discovery of a method for cutting nonmetallic materials such as wood, wood composites, and graphite composites using a router of unitary construction comprising alumina reinforced with silicon carbide whiskers. A "router of unitary construction" as used herein is a router which consists essentially of whisker-reinforced ceramic composite material, as distinguished from a router which uses uses "inserts" mounted on the flutes of the router.

The method of cutting nonmetallic materials disclosed herein substantially outperforms the prior art. Not only is productivity increased threefold but tool life is increased at least fourfold and cleanliness of cut is dramatically improved.

First, and quite unexpectedly, the ceramic composite router works under a severe combination of stresses and repeated impact loading without failure, at productivity rates substantially higher than that of prior art routers. In all machining operations, whether the workpiece be metal, wood, graphite composite, or otherwise, the removal of material from the workpiece is accomplished at the cutting edge of the tool by the generation of a chip. Though the chip removal mechanism at the cutting edge is the same for all operations, the kinds of stresses experienced by the tool material vary greatly. In a turning operation on a lathe, for instance, the cutting tool "insert" is of simple geometry and is held in place by a "tool holder," such that the insert is backed entirely by the tool holder. By mounting the insert in this fashion, it is intended that the insert material suffer only compressive stress and compressive impact loading.

By contrast, the cutting edge of a router of unitary construction is not "backed" by a tool holder. Thus, the router material is subjected to a combination of stresses including not only compressive stress and compressive impact loading at the cutting edge, but also shear stress, tensile stress, shear impact loading, and tensile impact loading in the shank.

It is well known that the compressive strength of alumina is greater than either its tensile strength or shear strength Alumina's compressive strength is approximately 300–400 ksi, whereas its tensile strength is in the range of only 45–50 ksi. Though the shear strength of alumina is imprecisely known and figures are not readily available, it is well known that alumina is generally not used in applications involving shear loading because of its low shear strength Also, though a number of the references, including Wei, disclose that alumina reinforced with silicon carbide whiskers shows improved toughness and flexural strength, none of the references teach that this material could withstand the severe combination of shear, tensile, and compressive stresses and repeated impact loading experienced by a router.

Tests of the router also demonstrated substantially increased productivity. For instance, a ½ inch diameter ceramic composite router was tested on medium density fiberboard at a ¾ inch depth of cut at a cutting speed of 20,000 rpm. At 500 inches per minute feed rate, the router cut smoothly and left a good finish with no sign of wear on the router's cutting edge By contrast, a ½ inch router made of tungsten carbide operated at the same speed, depth of cut, and feed rate would suffer high temperature corrosion, wear much more quickly, and not cut cleanly for nearly as long.

A second unexpected advantage is dramatically improved cleanliness of cut, which is very important in many woodworking industries such as the manufacture of fine furniture. Routers composed of prior art materials often mar, burn, or blacken the surface of the cut. For some reason yet unknown, the present invention does not mar, burn, or blacken the workpiece. Also, because the router maintains a sharp edge much longer, it will make more cuts without "feathering" the machined surface, i.e., the router cuts the grains of the wood flush with the softer intergrain material.

Finally, the tool life is extended because the cutting edge of the router remains sharp at least four times longer than that of the prior art. While the ceramic composite cutting tools in Rhodes retain a sharp cutting edge substantially longer than prior art materials when cutting metal, it has been shown that the cutting edge of the tools disclosed in Rhodes will flake or chip and eventually fail when cutting metal. By contrast, the cutting edge of the router does not flake or chip when cutting nonmetallic materials. The only mode of failure observed thus far has been complete and sudden breakage in the shank of the router at very high feed rates. Also, as a related advantage, the ceramic composite router does not experience high temperature corrosion as do other prior art materials such as tungsten carbide when cutting wood composites. See the Stewart article cited above. Thus, the tool life of the router has been shown to be unexpectedly high.

Thus, it has been demonstrated unexpectedly that the whisker-reinforced ceramic high speed router of unitary construction (1) can withstand the severe combination of compressive stress, tensile stress, shear stress, and repeated impact loading without failure at speeds, feed rates, and depths of cut as high or higher than any material disclosed in the art; (2) will generate clean, smooth, unmarred cuts; and (3) will maintain a sharp cutting edge four times longer than any of the materials disclosed in the prior art.

The matrix of the router is alumina. Alumina may be used either alone (i.e. containing no other materials except recognized impurities) or it may be combined or "doped" with minor amounts (i.e. less than about 30%) of toughening components or sintering aids such as zirconia, yttria, hafnia, magnesia, lanthana, silicon nitride, titanium carbide, or mixtures thereof. The Becher et al SAE paper cited above shows typical compositions containing up to 30 volume percent zirconia, with the zirconia incorporating up to 3 mole percent yttria.

The reinforcing whiskers are silicon carbide whiskers. Both the alpha and beta forms of silicon carbide whiskers are available commercially and can be employed. The whiskers used in this invention have a monocrystalline structure. A particularly preferred commercial source is those silicon carbide whiskers produced and marketed by Advanced Composite Materials Corporation. Such whiskers are produced from rice hulls and typically have diameters in range of 0.35 um to 0.65 um and aspect ratios on the order of 15–150. Strengths are typically on the order of 1 million psi (70,000 kg/cm$^2$) and tensile moduli on the order of 60-100 million psi (4–7 million kg/cm$^2$). The silicon carbide whiskers are thermally stable to at least 3200 F. (1760 C.). *Handbook of Fillers and Reinforcements for Plastics,* pages 446–64 (C. 25) (Von Nostrand Reinhold Co., N.Y. 1978).

Short fiber materials of the polycrystalline type are to be distinguished from single crystal whiskers used in this invention. The polycrystalline filaments or chopped fibers are much larger in diameter e.g., 10 microns or larger. As taught in the Wei patent referred to above, the polycrystalline fibers "suffer considerable degradation due to grain growth at temperatures above about 1250 C. which severely limited their use in high temperature fabrication processes such as hotpressing for producing ceramic composites of nearly theoretical density. Further, during high pressure loadings such as encountered during hot pressing, the polycrystalline fibers undergo fragmentation which detracts from the reinforcing properties of the fibers in the ceramic composites. Also, these polycrystalline fibers provided insufficient resistance to cracking of the ceramic composite since the fibers extending across the crack line or fracture plane possess insufficient tensile strength to inhibit crack growth through the composite especially after the composite has been fabricated by being exposed to elevated pressures and temperatures in hot pressing."

Also see Milewski, "Short-Fiber Reinforcements: Where The Action Is", *Plastics Compounding,* November/December 1979, pages 17–37. A clear distinction is drawn between single crystal "whiskers" and polycrystalline "microfibers" at pages 17–19.

The whiskers must be bound in the matrix in a manner so as to produce reinforcement of the matrix. The particular nature of bonding reinforcement is imperfectly known. However, the general considerations for good reinforcement have been described by a number of investigators. One concise description is found in Katz et al, *Handbook of Fillers and Reinforcements for Plastics,* 454–57 (1978). Bonding is satisfactory and good reinforcement is obtained when the ceramic whisker content is in the range of from about 2–40% volume percent of the whisker/matrix composite. Preferred compositions contain from about 5 to about 12 volume percent whiskers while particularly preferred compositions may contain from about 7 to about 8 volume percent whiskers. Above about 40% whisker content the addition of whiskers becomes detrimental to the toughness. It is believed that this may be due either to the whisker content becoming sufficiently large that zones of whisker concentration themselves have a limited toughness or that the ceramic matrix develops points at which the matrix cohesiveness is reduced. Below about 2% there is insufficient whisker content to provide adequate reinforcement.

The preferred ranges of whisker content will depend on the size and shape of the router and its end use. There may be a certain amount of routine experimentation required to determine the optimum content for a given end use; however, such should be easily performed by one skilled in the art.

The router is formed by first blending the proper proportions of the alumina in powdered form with the silicon carbide whiskers. A wide variety of systems are known for mixing of particulate solids. Several systems described in Perry et al, *Chemical Engineers' Handbook,* 21-30 to 21-36 (5th ed., 1973). The blending must be such that the whiskers are thoroughly dispersed throughout the particulate ceramic matrix material, but not be so severe that the whiskers are significantly degraded. A presently preferred method is described in U.S. Pat. No. 4,463,058 ("Hood").

Once the alumina and the whiskers are thoroughly blended, the formation of the router then proceeds in the same manner as formation of conventional routers. Typically the routers are formed by molding under pressures of 3,000–60,000 psi (200–400 kg/cm$^2$) and either simultaneously or subsequently sintered at temperatures on the order of 1500–3200 F. (800–1750 C.). A presently preferred method is described in U.S. patent application Ser. No. 831,242 ("Rhodes"). The particular shape molded will of course depend on the particular geometry of the router.

FIG. 1 shows a typical router. The router 1, sometimes referred to as a router bit, includes a shank 2 and cutting edges 3. A typical assembly is shown in FIG. 2. In FIG. 2 the shank of router 1 is held by chuck or collet 4 and is attached to rotating router shaft 5 of the router head 6. As shown in FIG. 2, the router is often positioned perpendicular to the direction of movement of the work piece past the cutting edges.

Tests have been run using the router to cut grooves in medium density fiberboard, white oak, and graphite composite materials. A ½ inch diameter ceramic composite router containing about 7.5 volume percent SiC whiskers in an alumina matrix was tested on medium density fiberboard with a ¾ inch depth of cut at a cutting speed of 20,000 rpm. At 500 inches per minute feed rate, the router cut smoothly and left a good finish with no sign of wear on the cutting edge. A ½ inch diameter router of the same composition was also used to cut white oak with a ¾ inch depth of cut at 60 inches per minute with similar results. Finally, test cuts on graphite composite materials were made with similar good results. A tungsten carbide router operated under these same conditions would suffer high temperature corrosion and lose its cutting edge much more quickly, resulting in "featered" cuts and burning and marring of the wood surfaces.

The industrial applicability of the present invention lies in the field of cutting nonmetallic materials. This invention can be used in virtually any industrial field in which cutting of nonmetallic materials is a factor, including the furniture, aerospace and general woodworking industries.

It will be evident that there is a wide variety of embodiments of the present invention which are not specifically described above but which are clearly within the scope and spirit of the present invention. The above description is therefore intended to be exemplary only and the scope of the invention is to be limited solely by the appended claims.

What is claimed is:

1. A method of cutting a nonmetallic graphite composite material comprising the steps of:

bringing a sintered composite tool having a knife-like cutting edge into contact with a nonmetallic graphite composite workpiece so that the knife-like edge engages the workpiece, said tool being of unitary construction and having a matrix consisting essentially of alumina having distributed therethrough 2-40 volume percent of silicon carbide whiskers.

2. A method as in claim 1 wherein said alumina matrix contains minor amounts of zirconia, yttria, hafnia, magnesia, lanthana silicon nitride, titanium carbide, or mixtures thereof.

3. A method as recited in claim 1 wherein said tool consists essentially of 88-95 volume percent alumina and 5-12 volume percent silicon carbide whiskers.

* * * * *